UNITED STATES PATENT OFFICE.

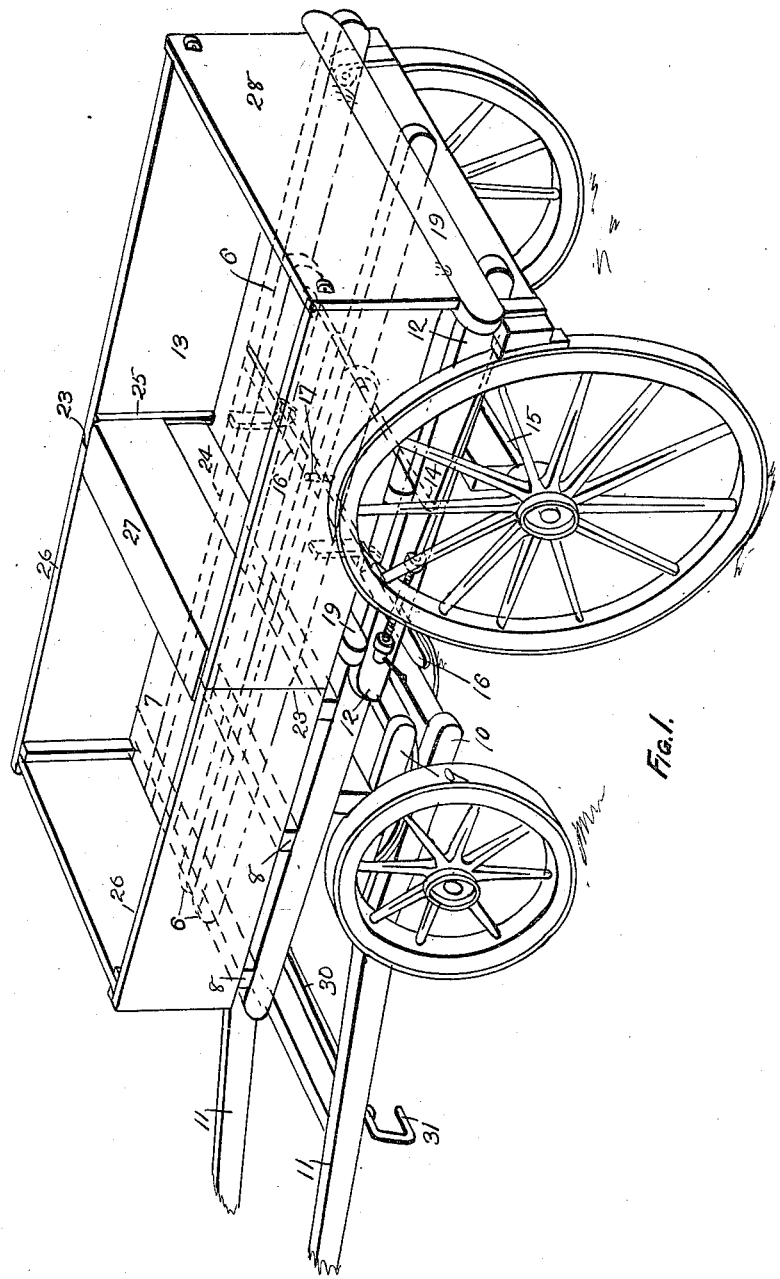

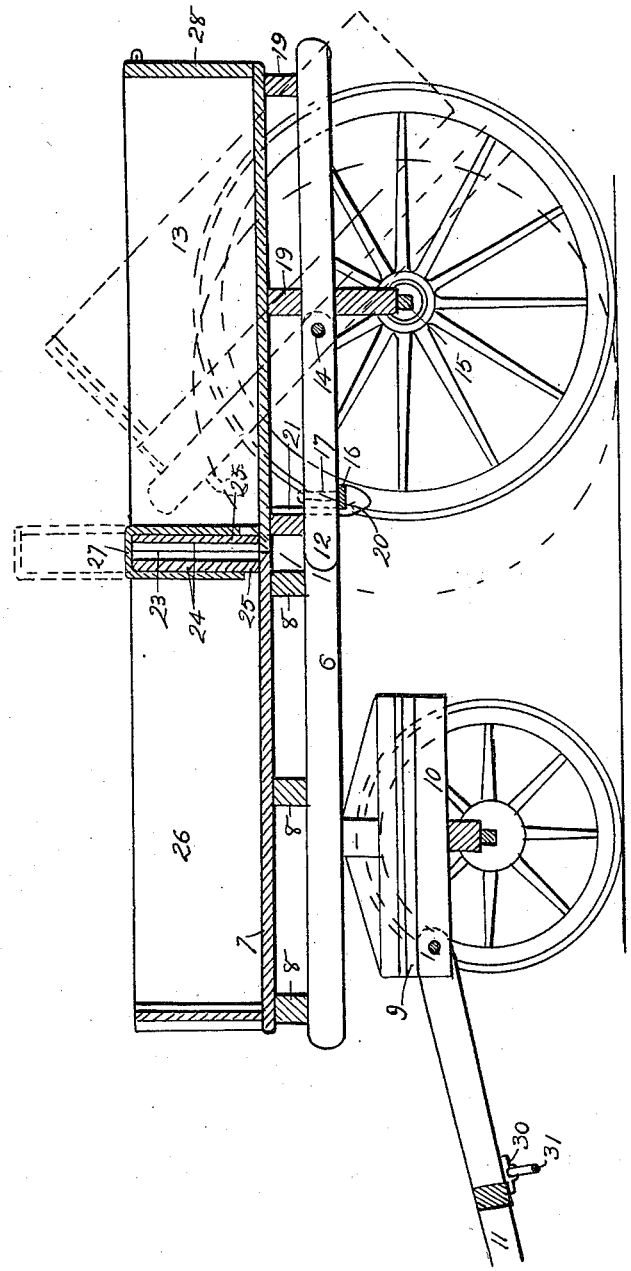

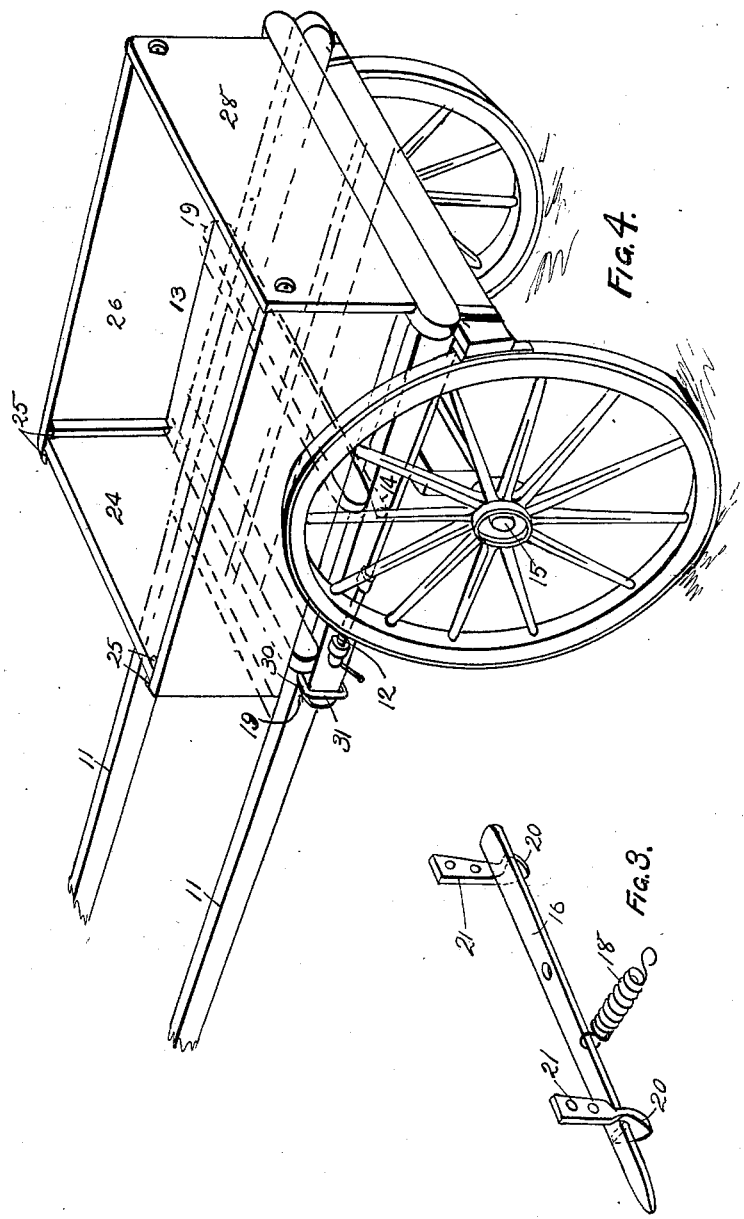

ALEXANDER MACDONALD, OF INVERELL, NEW SOUTH WALES, AUSTRALIA.

ROAD-WAGON.

1,093,447.   Specification of Letters Patent.   Patented Apr. 14, 1914.

Application filed November 18, 1912. Serial No. 731,974.

*To all whom it may concern:*

Be it known that I, ALEXANDER MACDONALD, a subject of the King of Great Britain and Ireland, residing at Bundarra Road, Inverell, in the State of New South Wales, Commonwealth of Australia, have invented certain new and useful Improvements in Road-Wagons, of which the following is a specification.

The present invention has been devised to provide a combination four-wheeled farmer's wagon and tip-dray so arranged that the rear portion of the wagon may be tipped and is detachable for separate use as an ordinary two-wheeled tip-dray. For this purpose the wagon is transversely divided at or about its mid-length, the two portions being detachable, the fore-part mounted upon an ordinary swiveling under-carriage while the rear portion comprises a tipping receptacle axially mounted upon the rear pair of wheels in the manner generally adopted for tip-drays.

The longitudinal frame members of the fore-part of the wagon mounted upon the swiveling under-carriage extend rearwardly and overlap the corresponding members of the rear part to which latter the said extended frame members are detachably connected by suitable means preferably a through bar or bolt.

In the preferred construction provision is made for covering the line of partition between the bottom and sides of the fore and rear portions of the wagon to prevent any passage therethrough of contained material such as grain or finely divided material. Further, the shafts of the wagon are preferably detachable so that the same may be attached to the rear portion when the latter is detached for use as a tip-cart, and said shafts are provided with means for holding down the forward end of the tipping or rear body-portion.

Referring now to the three sheets of drawings accompanying and forming part of this complete specification and wherein combination wagon and tip-dray construction according to the present invention is depicted:—Figure 1 is perspective view. Fig. 2 is longitudinal section. Fig. 3 is enlarged perspective view of the locking device pivotally attached to the forward portion of the wagon and for holding down the rearward tipping portion of the wagon. Fig. 4 is perspective view of the rear portion of the wagon detached for use as a tip cart.

The forward longitudinal members 6 supporting the forward body 7 of the wagon upon transverse bearers 8 are mounted upon the swiveling fore-carriage 9, the shafts 11 of the wagon being detachably secured to the longitudinal members 10 of the said carriage. The rearward ends of the said members 6 project rearwardly of the fore portion and overlap the forward ends of the longitudinal members 12 of the rearward body 13 of the wagon being detachably secured thereto by the removable transverse rod 14 passing therethrough. This rearward body 13 and its supporting frame, mounted in the ordinary manner for tipping purposes upon the axle 15 of the rear pair of wagon wheels, constitute the tip-dray portion of the wagon.

To prevent accidental or untoward tipping of the rear body-portion 13 of the wagon a transversely disposed locking-bar 16 is provided (see Fig. 3) pivoted about its mid-length on pivot-pin 17 projecting downwardly from one of the central longitudinal members 6 rearwardly extending from the fore body-portion. There are also provided a pair of opposingly disposed L-shaped catches 20 the vertical members 21 of which are secured to the opposite ends of the forward transverse bearer 19 of the rear part in such manner that the catches depend therefrom to engage the said locking bar 16 (as shown in Fig. 3) which is retained in such engagement by the spring 18 one end of which is attached to the said locking-bar and the other to one of the longitudinal members of the fore-part. The arrangement and construction of the catches and locking bar are such that as the rear body-portion assumes a horizontal position the descending catches deflect the locking-bar against the pull of the spring 18 until the L portions of the said catches have passed the bar which then by the reaction of the spring 18 assumes the locked position shown in Fig. 3. The ends of said rear-body locking bar 16 take up a position below the underneath face of each of the outer of the longitudinal members 12 of the rear body 13, one of said ends being extended to the side of the wagon for convenience in releasing the bar 16 when said body 13 is to be tilted.

To prevent the passage of any material through the division line between the forward body 7 and rear body 13 of the wagon a pair of removable parallel vertical boards 24 are provided traversing each of said bodies one on either side of said line 23 the ends of same being secured between the cleats 25 affixed to the sides 26 of said bodies. For closing the open top end of the space between said boards 24 the detachable inverted U-shaped board 27 is provided taking over said open end (see Figs. 1 and 2).

In use as a wagon the material contained in the rear body 13 may be tipped out by releasing the locking bar 16 (the tail piece 28 of the rear body 13 being removed) the body 13 turning about the rod 14 and the rear axle 15 will take up the dotted position in Fig. 2. The rear body 13 being in said dotted position loose material contained in the forward body 7 may be shoveled out of the rear end of the latter (the vertical board 24 being removed from between the cleats 25). When used for the carriage of bagged or other materials not likely to percolate through the line of partition the covering boards are obviously not necessary.

To detach the rear body 13 with its supporting framework, wheels and axle, from the forward portion of the wagon, the locking bar 16 is released, and the transverse rod 14 withdrawn from engagement with the rearward ends of the longitudinal members 6 of the wagon.

The pair of shafts 11 (as shown in Figs. 1 and 2) are detachably secured to the fore-carriage 9 and adapted for use with the rearward tip-dray portion, the rearward apertured ends of said shafts passing between the longitudinal members 12, the transverse rod 14 being passed through said shafts 11 and the members 12 (see Fig. 4). For holding down the body 13 of the tip-dray, the rod 30 is provided slidably and rotatably attached to said shafts 11, being terminally hooked at 31 to take round the forward end of one of the longitudinal frame members 12.

Referring to Fig. 4 it will be noted that the board 24 forms the front board of the body of the tip-dray.

What I claim and desire to secure by Letters Patent is:—

1. A wagon, comprising a rear wheel supported frame mounted to tilt on the axle and having forwardly projecting side members, a body mounted on the said frame, a swiveled front wheel supported frame having rearwardly projecting side members extending between the side members of the rear frame adjacent to the axle of said frame, a body mounted on the front frame and approximately of the same size and shape as the body of the rear frame, shafts for the wagon, a removable rod passing through the side members of the front and rear frames adjacent to the axle of the said rear frame and connecting the frames together with their bodies meeting at the center of length of the wagon, said rod also serving as a means for connecting the shafts with the rear portion of the wagon when the front portion is detached, and means for locking the said side members together.

2. A wagon, comprising a rear wheel supported tilting body having side supporting members, a front body having side members projecting rearwardly beyond the body and lapping upon the sides of the members of the rear body, means for connecting the rear end board of the front body and the front end board of the rear body together, a swiveled fore-carriage upon which the front body is mounted, means for pivotally connecting the side members of the bodies together, the pivotal connection being in front of and adjacent to the axle of the rear body, and means in front of the pivotal connection for locking the said members together.

3. In a wagon of the character described, a fixed front body section, a rear tilting body section, the rear end board of the front section and the front end board of the rear section being spaced apart, and an inverted U-shaped cover fitting over said boards.

In testimony whereof I affix my signature in presence of two witnesses.

ALEXANDER MACDONALD.

Witnesses:
WILLIAM BURTON HALLORAN,
JOHN EDWARD JAMISON.

---

Copies of this patent may be obtained for five cents each, by addressing the "Commissioner of Patents, Washington, D. C."